(12) United States Patent
Sagehorn

(10) Patent No.: US 9,554,496 B1
(45) Date of Patent: Jan. 31, 2017

(54) WEEDING TOOL SYSTEM AND METHOD OF USE

(71) Applicant: Thomas J. Sagehorn, North Barrington, IL (US)

(72) Inventor: Thomas J. Sagehorn, North Barrington, IL (US)

( * ) Notice: Subject to any disclaimer, the term of this patent is extended or adjusted under 35 U.S.C. 154(b) by 0 days.

(21) Appl. No.: 14/859,568

(22) Filed: Sep. 21, 2015

Related U.S. Application Data

(60) Provisional application No. 62/071,381, filed on Sep. 22, 2014.

(51) Int. Cl.
*A01B 1/16* (2006.01)

(52) U.S. Cl.
CPC .......... *A01B 1/16* (2013.01); *A01B 1/165* (2013.01)

(58) Field of Classification Search
CPC combination set(s) only.
See application file for complete search history.

(56) References Cited

U.S. PATENT DOCUMENTS

| | | | | |
|---|---|---|---|---|
| 772,097 A | * | 10/1904 | Hayes .................. | A01B 1/16 171/55 |
| 2,402,550 A | * | 6/1946 | Hiack ................... | A01B 1/165 294/50.5 |
| 3,444,934 A | * | 5/1969 | Alberto ................. | A01B 1/16 172/25 |
| 4,832,131 A | * | 5/1989 | Powell .................. | A01G 3/062 172/25 |
| 5,452,767 A | * | 9/1995 | Smotherman ......... | A01B 1/16 172/25 |
| 2006/0062632 A1 | * | 3/2006 | Jang ..................... | E04H 15/46 403/109.6 |
| 2008/0172801 A1 | * | 7/2008 | Biag ..................... | A01B 1/16 7/114 |
| 2014/0027136 A1 | * | 1/2014 | Chow ................... | A01B 33/106 172/378 |

FOREIGN PATENT DOCUMENTS

| | | | | |
|---|---|---|---|---|
| DE | 10121256 A1 | * | 10/2002 | ............. A01B 1/16 |
| GB | 433758 A | * | 8/1935 | ............. A01B 1/165 |

* cited by examiner

*Primary Examiner* — Alicia Torres
(74) *Attorney, Agent, or Firm* — Richard G. Eldredge

(57) ABSTRACT

A weed removal system includes a first handle integrally attached to an elongated hollow outer shaft; a second handle rotatably attached to the outer shaft; an inner shaft slidingly engaged within a cavity formed by the hollow outer shaft; and a tool secured to the inner shaft and configured to engage with a weed. The method includes adjusting the overall length of the outer shaft and the inner shaft; exerting a downward force such against the outer shaft and the inner shaft such that the tool applies pressure against the weed; and twisting the first handle relative to the second handle while the tool is in contact with the weed.

17 Claims, 6 Drawing Sheets

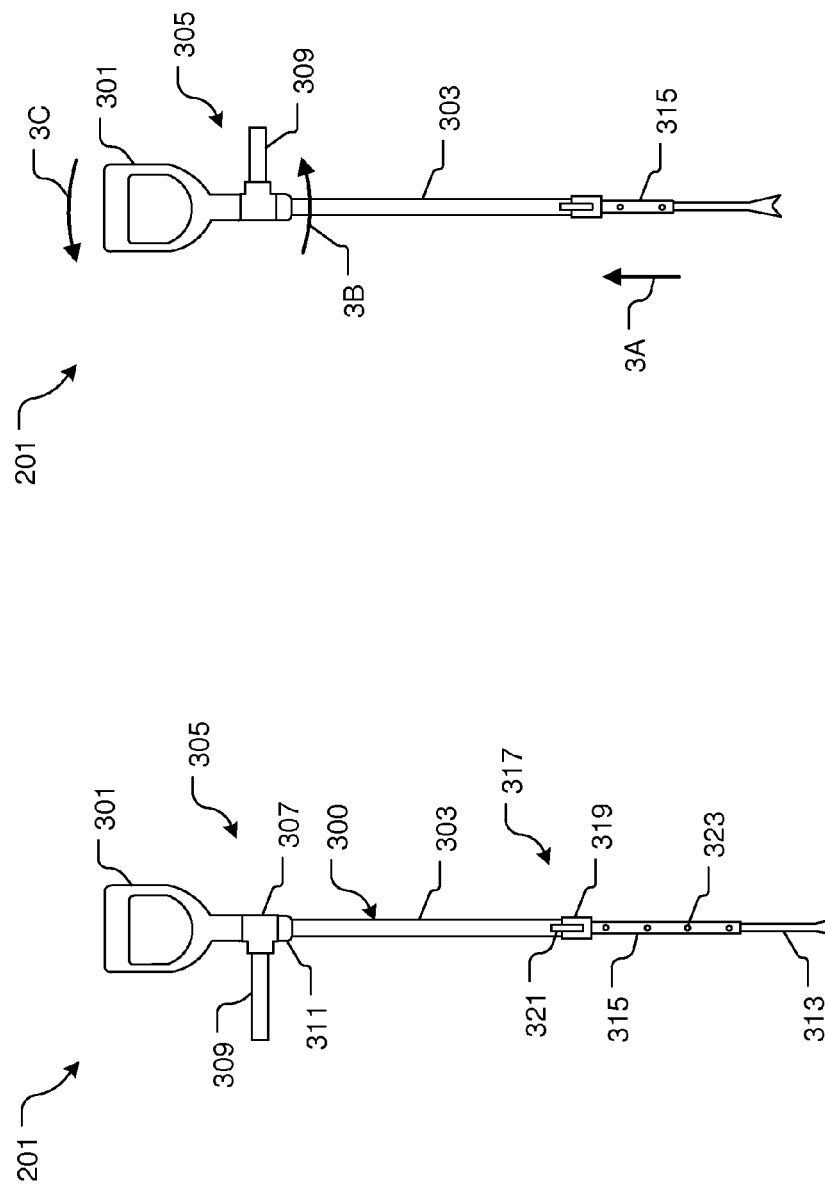

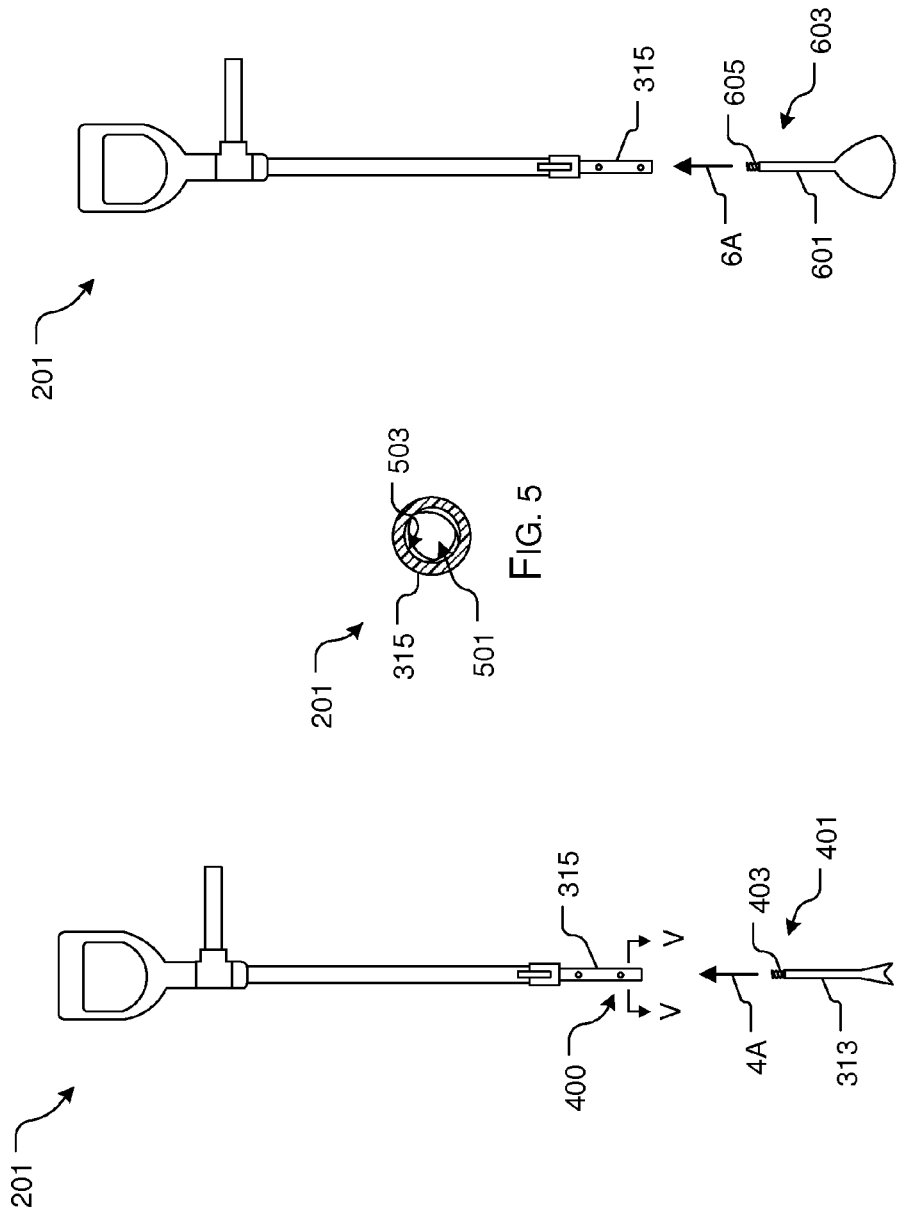

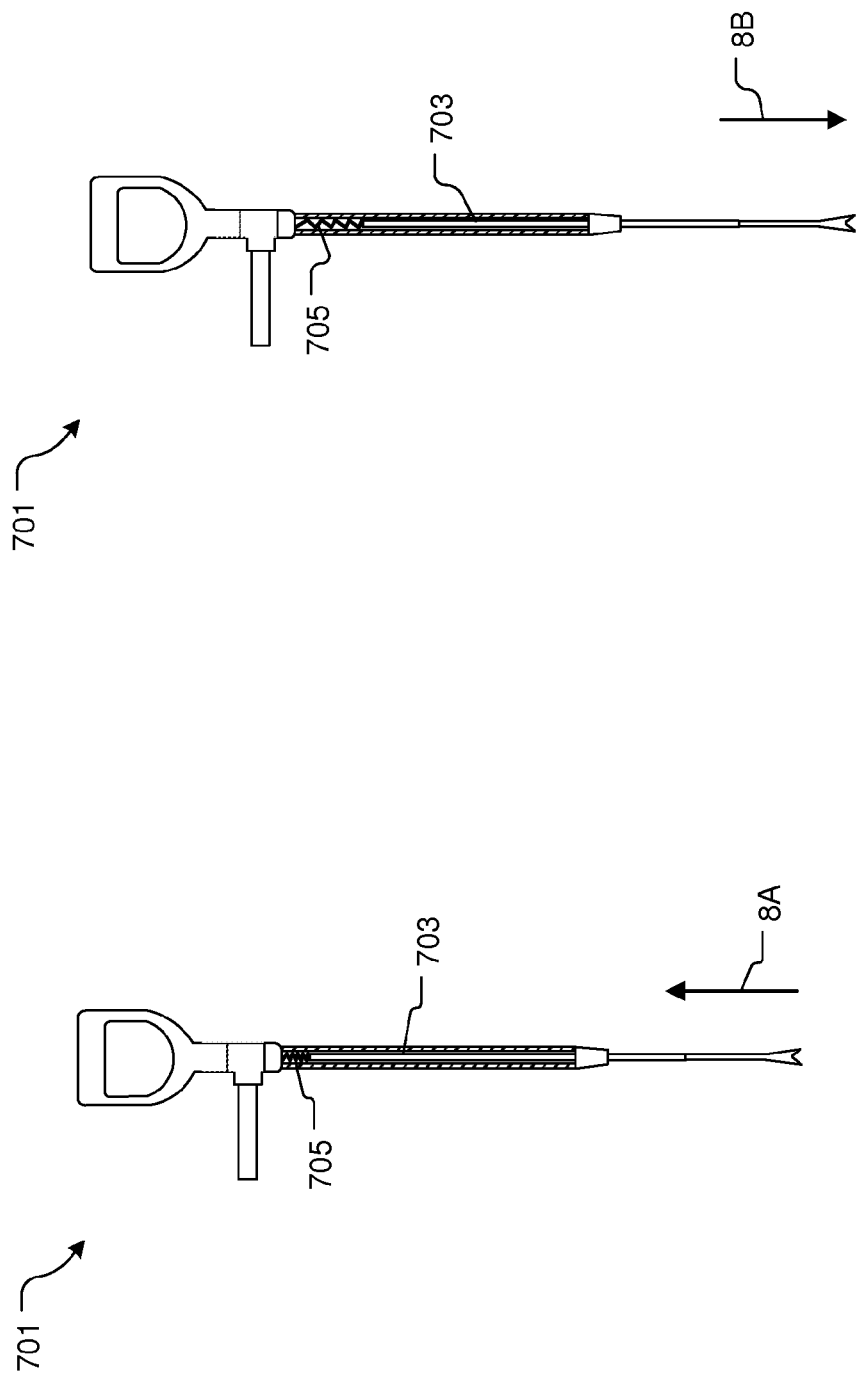

WEEDING TOOL SYSTEM AND METHOD OF USE

BACKGROUND

1. Field of the Invention

The present invention relates generally to weeding tools.

2. Description of Related Art

Tools used for weeding are well known in the art and are effective means to reduce the time and effort to pull weeds from the ground surface. For example, FIG. 1 depicts a simplified front view of a person removing a weed 101 from the ground surface 103 via a tool 105 having a spade 107 for digging. During use, the spade 107 is gripped with a hand 109 of the person while the other hand 111 is used to remove the weed 101.

It should be understood that the conventional process of removing a weed 101 has limitations. For example, the process requires the person to bend over and/or sit on the ground surface to remove the weed with the weeder tool. These disadvantages are burdensome to persons having bad backs, elderly persons who do not easily bend over, and the like. Accordingly, there is a long-felt need for a weeder tool that allows the person to remove the weed without such limitations discussed above.

Although great strides have been made in the area of weeder tools, many shortcomings remain.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

FIGS. 3A, 3B, and 4 are front views of the system of FIG. 2;

FIG. 5 is a cross-sectional view of an inner shaft of the system of FIG. 4;

FIG. 6 is a front view of the system of FIG. 2; and

FIGS. 7, 8A, and 8B are front views of a weeder tool system in accordance with an alternative embodiment of the present application.

Figure 1:
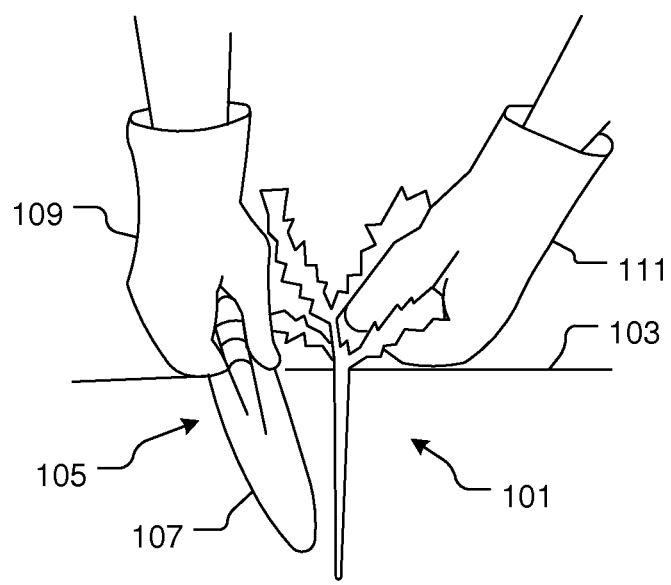
FIG. 1 is a simplified schematic of a conventional weeder tool.

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use in accordance with the present application overcomes one or more of the above-discussed problems commonly associated with conventional weeder tools and methods of use. Specifically, the system and method of the present application provides rapid and effective means to remove the weed without needing to bend over and/or sit on the ground surface. Such advantages allow elderly and/or users with bending and sitting limitations to remove the weeds without causing discomfort or harm. These and other unique features of the system and method of use are discussed below and illustrated in the accompanying drawings.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

Figure 2:
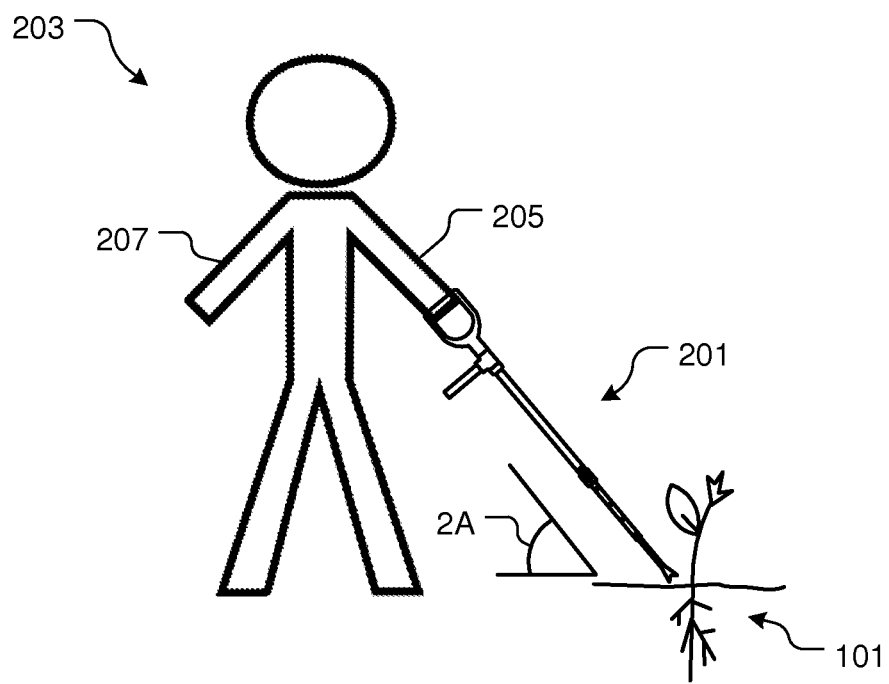
FIG. 2 is a simplified schematic of a user utilizing the weeder tool system in accordance with a preferred embodiment of the present application.

Referring now to the drawings wherein like reference characters identify corresponding or similar elements throughout the several views, FIG. 2 depicts simplified front view of a weeder system 201 being utilized by a user 203 in accordance with a preferred embodiment of the present application. It will be appreciated that system 201 overcomes one of more of the above-listed problems commonly associated with the conventional weeder tools.

As depicted, a user 203 secures system 201 in a first hand 205, directs the system 201 towards weed 101 at an angle 2A and thereafter uses a second hand 207 to manipulate the rotation of the system 201, as will be described below.

It will be appreciated that in the preferred embodiment, the intended use is to maximize the thrusting force of the system 201 with the weed 101 is easily removed. Accordingly, the angle 2A and hands 205, 207 are manipulated with minimal effort, while maximum force is applied against the weed during the removal process. It will also be appreciated that the body force of the user can be used during the removal process to maximize efficiency.

Referring now to FIGS. 3A-6, various views of the system 201 are shown in accordance with the preferred embodiment.

System 201 includes a handle 301 configured to provide gripping access to either hand 205 or 207 and is integrally attached to an outer hollow shaft 303 extending therefrom.

System 201 is further provided with a second gripping handle 305 that extends relatively perpendicular to shaft 303 and is rotatably attached to an outer surface 300 of shaft 303. Handle 305 is provided with a pivot joint 307 configured to rotate about surface 300 and is provided with an elongated gripping member 309 integrally attached to and extending from joint 307. A stop device 311 is rigidly attached to surface 300 and is configured to retain 307 in position.

One of the unique features believed characteristic of the present application is the ability to manipulate both handles 301, 305 with hands 205, 207 in a twisting fashion relative to each other, as shown with arrows 3B, 3C, to remove weed 101. Further details of these features are discussed below.

It should be understood that the intended use of system 201 is extend an overall reach of a tool 313 utilized to come adjacent with and to pull and lift the weed 101 from the ground surface. To achieve this feature, system 201 includes an elongated outer hollow shaft 303 and an inner shaft 315 configured to slidingly engage within an interior cavity (not shown) created by the hollow shaft 303.

Another unique feature believed characteristic of the present system 201 is to utilize a locking mechanism 317 secured to shaft 303 and configured to engage with and lock shaft 315 in a fixed position relative to shaft 303. Accordingly, locking mechanism 317 allows the user to selectively determine the overall length of shafts 303 and 315 via locking mechanism 317.

In the preferred embodiment, locking mechanism 317 includes a body 319 having an opening configured to slidingly engage with shaft 315 and a lever 321 pivotally attached to body 319 and configured to engage with one or more holes 323 extending partially through the thickness of shaft 315.

During use, the shaft 315 slides within shaft 303, as shown with arrow 3A, and the locking mechanism 317 is engaged with hole 323 when a determined overall length is desired. This feature allows persons of different heights to utilize the features of system 201 during the weed removal process.

Referring now specifically to FIGS. 4-6, it will be appreciated that another unique feature of system 201 is the ability to interchange the weeder tools during use. For example, FIGS. 4-6 depict system 201 being adapted for use with a tool 313 and a tool 601. To achieve this feature, system 201 includes at least a partially hollow shaft 315 with a threaded end 400 that threadedly engages with the tools. These features are shown in FIG. 5, wherein shaft 315 forms a hollow interior area 501 with a threaded inner surface 503 adapted to engage with the tool. Accordingly, the tool engages with the threads of inner surface 503 and retained in position therein area 501.

In FIG. 4, tool 313 includes an end portion 401 having a threaded surface area 403, while in FIG. 6, tool 601 includes an end portion 603 having a threaded surface area 605. It should be understood that tools 315, 603 could have different intended uses, for example, tool 601 could be used as a shovel, while tool 313 could be used as a weed extractor.

In the contemplated embodiment, the tools threadedly engage with shaft 315; however, it is also contemplated having one or more different types of fastening means in lieu of threads in alternative embodiments.

Figure 7:
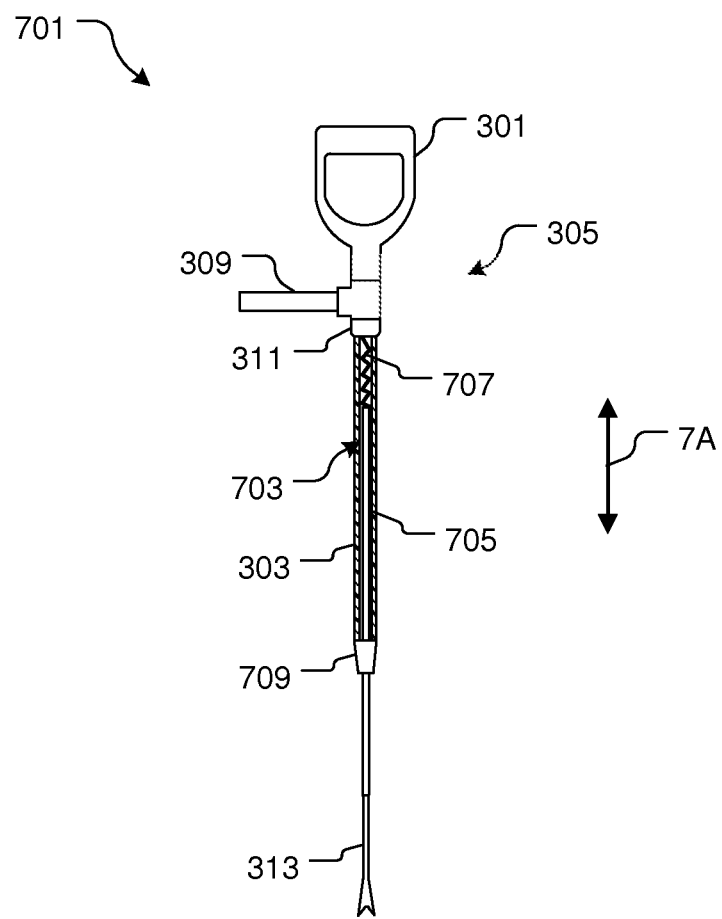

Referring now to FIGS. 7-9, front views of a system 701 is shown in accordance with an alternative embodiment of the present application. It will be appreciated that system 701 is substantially similar in form and function to system 201 and incorporates the features discussed herein.

One of the unique features believed characteristic of system 701 is the use of a spring loaded shaft to add additional pulling force during the weed removal process. To achieve this feature, system 701 includes a hollow shaft 303 that forms an inner cavity 703 that receives an elongated inner shaft 705 therein. A spring 707 also fits within cavity 703 and is configured to engage with shaft 705. A stop device 709 is secured to shaft 303 and includes an opening that slidingly engages with shaft 705 to allows longitudinal movement of the shafts relative to each other, as depicted with arrow 7A.

During use, the user creates potential energy via spring 707 by compression force, and thereafter releases the potential energy during the extraction process of removing weed 101. These features are shown in FIGS. 8A and 8B with corresponding arrows 8A, 8B depicting the movement of the inner shaft during use. Accordingly, the energy from the spring along with the twisting forces of the handles creates an effective means to remove the weed from the ground surface during the extraction process.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A weed removal system, comprising:
   a first handle integrally attached to an elongated hollow outer shaft;
   a second handle rotatably attached to the outer shaft, the second handle having:
      a joint configured to rotatably engage with an outer surface of the outer shaft; and
      a member integrally attached to and extending from the joint, the member being configured to extend in a direction relatively perpendicular to the outer shaft;
   an inner shaft slidingly engaged within a cavity formed by the hollow outer shaft;
   a tool secured to the inner shaft and configured to engage with a weed;
   wherein an overall length of the outer shaft and the inner shaft is adjustable by sliding the inner shaft within the cavity of the outer shaft; and
   wherein the first handle is configured to rotate in a first direction while the second handle is configured to rotate in a second direction opposing the first direction.

2. The system of claim 1, further comprising:
   a stop device secured to the outer surface of the outer shaft and configured to retain the joint in a fixed position.

3. The system of claim 1, further comprising:
   a locking mechanism configured to secure the inner shaft in a fixed position relative to the outer shaft.

4. The system of claim 3, the locking mechanism comprising:
   a body engaged with an outer surface of the outer shaft; and
   a lever pivotally attached to the body;

wherein the lever is configured to engage with one or more holes extending partially through a thickness of the inner shaft.

5. The system of claim 1, wherein the tool is removably attached to the inner shaft.

6. The system of claim 5, wherein the tool is threadedly attached to the inner shaft.

7. The system of claim 5, the inner shaft comprising:
a hollow cavity; and
a threaded inner surface configured to engage with a threaded end of the tool.

8. The system of claim 1, further comprising:
a spring disposed within the cavity of the hollow outer shaft and configured to engage with the inner shaft;
wherein the spring creates a sliding force of the inner shaft relative to the outer shaft.

9. A weed removal system, comprising:
an elongated hollow outer shaft;
an inner shaft slidingly engaged within a cavity formed by the hollow outer shaft;
a spring disposed within the cavity of the hollow outer shaft and configured to engage with the inner shaft;
a tool secured to the inner shaft and configured to engage with a weed;
a first handle integrally attached to hollow outer shaft; and
a second handle rotatably attached to the outer shaft, the second handle having:
a joint configured to rotatably engage with an outer surface of the outer shaft; and
a member integrally attached to and extending from the joint, the member being configured to extend in a direction relatively perpendicular to the outer shaft;
wherein the first handle is configured to rotate in a first direction while the second handle is configured to rotate in a second direction opposing the first direction;
wherein an overall length of the outer shaft and the inner shaft is adjustable by sliding the inner shaft within the cavity of the outer shaft; and
wherein the spring creates a sliding force of the inner shaft relative to the outer shaft.

10. The system of claim 9, further comprising:
a stop device secured to the outer surface of the outer shaft and configured to retain the joint in a fixed position.

11. The system of claim 9, further comprising:
a locking mechanism configured to secure the inner shaft in a fixed position relative to the outer shaft.

12. The system of claim 11, the locking mechanism comprising:
a body engaged with an outer surface of the outer shaft; and
a lever pivotally attached to the body;
wherein the lever is configured to engage with one or more holes extending partially through a thickness of the inner shaft.

13. The system of claim 9, wherein the tool is removably attached to the inner shaft.

14. The system of claim 13, wherein the tool is threadedly attached to the inner shaft.

15. The system of claim 13, the inner shaft comprising:
a hollow cavity; and
a threaded inner surface configured to engage with a threaded end of the tool.

16. A method to remove a weed from a ground surface, comprising:
providing the system of claim 1;
adjusting the overall length of the outer shaft and the inner shaft;
exerting a downward force against the outer shaft and the inner shaft;
applying pressure against the weed via the tool;
twisting the first handle relative to the second handle while the tool is in contact with the weed.

17. The method of claim 16, further comprising:
creating a force with a spring disposed within the outer shaft and in contact with the inner shaft.

* * * * *